(12) United States Patent
Franssen et al.

(10) Patent No.: US 10,384,382 B2
(45) Date of Patent: Aug. 20, 2019

(54) PROCESS FOR THE PREPARATION OF PLASTIC COMPOSITE MOLDED BODIES

(71) Applicant: MOMENTIVE PERFORMANCE MATERIALS GMBH, Leverkusen (DE)

(72) Inventors: Oliver Franssen, Nidderau (DE); Clemens Trumm, Sankt Augustin (DE)

(73) Assignee: Momentive Performance Materials GmbH, Leverkusen (DE)

( * ) Notice: Subject to any disclaimer, the term of this patent is extended or adjusted under 35 U.S.C. 154(b) by 888 days.

(21) Appl. No.: 14/406,233

(22) PCT Filed: Jun. 11, 2013

(86) PCT No.: PCT/EP2013/061951
§ 371 (c)(1),
(2) Date: Dec. 8, 2014

(87) PCT Pub. No.: WO2013/186185
PCT Pub. Date: Dec. 19, 2013

(65) Prior Publication Data
US 2015/0298375 A1 Oct. 22, 2015

(30) Foreign Application Priority Data

Jun. 11, 2012 (DE) .......... 10 2012 105 009

(51) Int. Cl.
*B29L 1/00* (2006.01)
*B29C 45/16* (2006.01)
(Continued)

(52) U.S. Cl.
CPC ...... *B29C 45/1676* (2013.01); *B29C 35/0805* (2013.01); *B29C 35/0888* (2013.01);
(Continued)

(58) Field of Classification Search
CPC ............ B29C 45/1676; B29C 35/0805; B29C 35/0888; B29C 45/0053; B29C 45/14;
(Continued)

(56) References Cited

U.S. PATENT DOCUMENTS 3,344,111 A 9/1967 Chalk
3,445,420 A 5/1969 Kookootsedes et al.
(Continued)

FOREIGN PATENT DOCUMENTS

DE 4229224 A1 3/1994
DE 19619999 A1 11/1997
(Continued)

OTHER PUBLICATIONS

International Search Report for corresponding PCT/EP2013/061951 dated Sep. 5, 2013, three pages.
(Continued)

*Primary Examiner* — Joseph S Del Sole
*Assistant Examiner* — John Robitaille
(74) *Attorney, Agent, or Firm* — Rankin, Hill & Clark LLP

(57) ABSTRACT

Process for the preparation of plastic composite molded bodies in which hard-soft molded bodies made of low-melting thermoplastics and light curable polyorganosiloxane compositions are prepared as well as products produced by this process.

17 Claims, 1 Drawing Sheet

Figure 1:
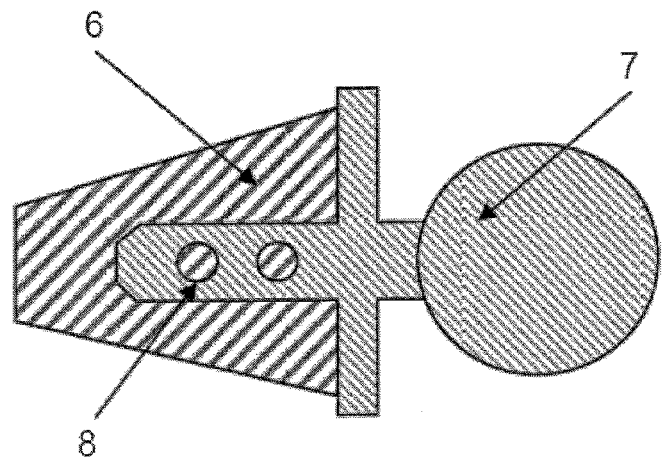

(51) Int. Cl.
| | |
|---|---|
| *B29C 35/08* | (2006.01) |
| *B29C 45/00* | (2006.01) |
| *B29C 45/14* | (2006.01) |
| *B32B 1/02* | (2006.01) |
| *B32B 27/08* | (2006.01) |
| *B32B 27/28* | (2006.01) |
| *B32B 27/32* | (2006.01) |
| *B65D 41/00* | (2006.01) |
| *B29K 283/00* | (2006.01) |
| *B29K 83/00* | (2006.01) |
| *B29K 23/00* | (2006.01) |

(52) U.S. Cl.
CPC .......... *B29C 45/0053* (2013.01); *B29C 45/14* (2013.01); *B32B 1/02* (2013.01); *B32B 27/08* (2013.01); *B32B 27/283* (2013.01); *B32B 27/32* (2013.01); *B65D 41/00* (2013.01); *B29C 2035/0827* (2013.01); *B29C 2045/0075* (2013.01); *B29K 2023/12* (2013.01); *B29K 2083/00* (2013.01); *B29K 2283/00* (2013.01); *B29K 2995/0012* (2013.01); *B29L 2001/002* (2013.01); *B32B 2250/02* (2013.01); *B32B 2250/24* (2013.01); *B32B 2439/70* (2013.01)

(58) Field of Classification Search
CPC ......... B32B 1/02; B32B 27/08; B32B 27/283; B32B 27/32; B65D 41/00
See application file for complete search history.

(56) References Cited

U.S. PATENT DOCUMENTS

| | | | |
|---|---|---|---|
| 3,882,083 A | 5/1975 | Berger et al. | |
| 3,989,667 A | 11/1976 | Lee et al. | |
| 4,043,977 A | 8/1977 | deMontigny et al. | |
| 4,256,870 A | 3/1981 | Eckberg | |
| 4,337,332 A | 6/1982 | Melancon et al. | |
| 4,344,800 A | 8/1982 | Lutz | |
| 4,347,346 A | 8/1982 | Eckberg | |
| 4,476,166 A | 10/1984 | Eckberg | |
| 4,530,879 A | 7/1985 | Drahnak | |
| 4,562,096 A | 12/1985 | Lo et al. | |
| 4,576,999 A | 3/1986 | Eckberg | |
| 4,635,947 A * | 1/1987 | Hatayama ................ B60J 10/17 | 277/345 |
| 4,728,469 A | 3/1988 | Danner et al. | |
| 4,735,753 A * | 4/1988 | Ackermann ........... A41H 37/04 | 156/580.1 |
| 4,774,111 A | 9/1988 | Lo | |
| 4,784,591 A * | 11/1988 | Ackermann ........... A41H 37/04 | 156/580.2 |
| 4,879,318 A | 11/1989 | Lipscomb et al. | |
| 5,401,155 A | 3/1995 | Shikagawa et al. | |
| 5,449,560 A * | 9/1995 | Antheunis ......... B32B 17/10036 | 428/447 |
| 5,693,688 A | 12/1997 | Priou | |
| 5,807,906 A | 9/1998 | Bonvallot et al. | |
| 5,866,261 A | 2/1999 | Kerr, III et al. | |
| 5,885,514 A * | 3/1999 | Tensor ................ B29C 35/0888 | 264/478 |
| 5,932,282 A | 8/1999 | Diener et al. | |
| 5,952,397 A | 9/1999 | Fujki et al. | |
| 6,627,124 B1 | 9/2003 | Herbrechtsmeier et al. | |
| 7,767,229 B1 | 8/2010 | Milne et al. | |
| 8,399,086 B2 | 3/2013 | Itoh et al. | |
| 8,454,862 B2 | 6/2013 | Andino et al. | |
| 9,180,633 B2 | 11/2015 | Widman et al. | |
| 9,731,435 B2 | 8/2017 | Rist et al. | |
| 2002/0057972 A1* | 5/2002 | Barinaga ............... B41J 2/17596 | 417/413.3 |
| 2003/0219571 A1 | 11/2003 | Tait et al. | |
| 2003/0219577 A1 | 11/2003 | Tait et al. | |
| 2005/0181196 A1 | 8/2005 | Aylward et al. | |
| 2005/0253290 A1 | 11/2005 | Yokoyama et al. | |
| 2006/0267243 A1 | 11/2006 | Tindall | |
| 2007/0141739 A1 | 6/2007 | Thompson et al. | |
| 2007/0287208 A1 | 12/2007 | Thompson et al. | |
| 2008/0144196 A1 | 6/2008 | Kitamura et al. | |
| 2008/0193749 A1 | 8/2008 | Thompson et al. | |
| 2008/0230958 A1 | 9/2008 | Jin | |
| 2008/0246190 A1 | 10/2008 | Yokoyama et al. | |
| 2010/0181014 A1 | 7/2010 | Raymond et al. | |
| 2010/0262272 A1 | 10/2010 | Shkolnik et al. | |
| 2012/0015283 A1* | 1/2012 | Cha ..................... H01M 8/0284 | 429/516 |
| 2012/0267152 A1 | 10/2012 | Hara et al. | |

FOREIGN PATENT DOCUMENTS

| | | |
|---|---|---|
| JP | 8-174604 | 7/1996 |
| JP | 11-179739 A | 7/1999 |
| JP | 2003-226352 A | 8/2003 |
| JP | 2007112025 A | 5/2007 |
| JP | 2011-150946 A | 6/2011 |
| TW | 200809147 A * | 2/2008 |
| WO | 2007/108444 A1 | 8/2009 |

OTHER PUBLICATIONS

International Preliminary Report on Patentability for corresponding PCT/EP2013/061951 dated Dec. 24, 2014, eight pages.
Espacenet bibliographic data for German Publication No. 4229224 published Mar. 10, 1994, one page.
Espacenet bibliographic data for Japanese Publication No. 08174604 published Jul. 9, 1996, two pages.
Espacenet bibliographic data for DE19619999 published Nov. 20, 1997, one page.
Espacenet bibliographic data for JPWO2007108444 published Aug. 6, 2009, one page.
Machine translation for JP2007112025 published May 10, 2007, 11 pages.
Machine translation for JP11-179739 published Jul. 6, 1999, eight pages.
LED UV Wavelength, www.phoseon.com/technology/led-uv-wavelength, two pages.
Espacenet bibliographic data for JP2003226352 published Aug. 12, 2003, one page.
Espacenet bibliographic data for JP2011150946 published Aug. 4, 2011, one page.

* cited by examiner

Step I):

Steps II) and III):

PROCESS FOR THE PREPARATION OF PLASTIC COMPOSITE MOLDED BODIES

The present invention relates to a process for the preparation of plastic composite molded bodies in which in particular hard-soft molded bodies, preferably made of low melting thermoplastics or thermoset plastics and light curable polyorganosiloxane compositions, are prepared in a continuous molding step.

Composite molded bodies made from thermoplastics and elastomers such as baby suckers or keyboards with elastomeric pressure sensitive mats are known. The exclusive use of thermoplastics for producing such molded bodies in general is not possible, because they have too high a hardness and are not elastic, in particular for sealing purposes. The haptics of the thermoplastics or thermoset plastics are also often unsatisfactory. On the other side, the softer elastomer articles often have an insufficient mechanical strength to provide the molded bodies with the necessary stability. Therefore, there is often a need to produce plastic composite molded bodies consisting of a hard thermoplastic or thermoset shape support article and a soft elastomeric article, which is often located on the surface, which in particular determines the haptics, the electrical properties or the sealing force. Such composite molded bodies are currently manufactured by mechanical assembly of thermoplastic and elastomeric articles. A specific variant of this is the two-component injection molding of heat-curable elastomers with thermoplastic articles in a common mold. In this case, the elastomers are crosslinked at a temperature above 120° C. Previously, the thermoplastic molded article has to be cooled down from the molten state to solidify or to maintain the shape, respectively. This procedure is obviously energetically very unfavorable, since it must first be heated (shaping of the thermoplastics or thermoset plastics), must then be cooled and must be heated again afterwards for crosslinking of the elastomers. Further, the crosslinking temperature of the elastomer, in turn, must not exceed the softening temperature of the thermoplastic. Thus, only certain high-quality plastics having a high heat resistance can be used.

The underlying problem of the present invention was, among other things, to produce composite molded bodies from low-melting, often cheaper plastics having a low heat resistance, and, thus, to expand the spectrum of available hard composite materials. Moreover, in this manner it should also be possible to use, for example, more ecologically sustainable alternative materials in the manufacture of such composite molded bodies, which is particularly relevant in those areas in which the composite molded body comes either directly or indirectly in contact with humans such as in food packaging. Finally, the energetically unfavorable procedure with two heating steps should be avoided in the manufacture of the composite molded bodies. The inventors have found that such composite molded bodies can be produced advantageously by using silicone compositions which are light curable at low temperatures, in particular between 0 to 50° C.

Composite articles of any thermoplastics and silicone elastomers can be assembled with this material combination even in injection molding processes using either molds or molding tools having thermoplastic insert articles, respectively, or two component molds and a variety of useful composite molded bodies can produced in an economic and ecologically sustainable manner. Furthermore, due to the process according to the present invention, many of the low-melting thermoplastics are now for the first time available for the production of composite molded bodies even in the field of food containers or drinking water supply installations.

With the specific embodiment in which the irradiation of the light curable silicone composition occurs through the plastic molded body, especially transparent molds or molds with transparent components become dispensable, which leads to a cost reduction of the process, since the usual transparent elements, which are an integral article of molds for light curable materials, are subject to unwanted ageing processes by UV irradiation.

The present invention, therefore, relates to a process for the preparation of plastic composite molded bodies, comprising the steps of:
a) Providing a molded article of a thermoplastic or thermoset resin in a mold,
b) Introducing a light curable silicone composition into said mold containing said molded article,
c) Irradiating the light curable silicone composition with light of a wavelength suitable for curing the silicone composition to form a composite molded body from said molded article and the cured silicone composition.

The thermoplastics used in the present invention are selected in particular from the group of polymers having a heat deflection temperature (HDT) according to DIN EN ISO 75-1,-2 (preferably method B, 0.45 Mpa) of less than 160° C., preferably less than 150° C., preferably less than 140° C., preferably less than 130° C. and particularly preferred less than 120° C.

Examples of the thermoplastics are in particular selected from the group consisting of ABS (acrylonitrile butadiene styrene copolymer), polyamides (PA), polyoxymethylene (POM), polybutylene terephthalate (PBT), polyethylene terephthalate (PET), polyolefins selected from polyethylene (PE), polypropylene (PP) and polyethylene dicyclopentadiene polymers (COC), polymethylmethacrylate (PMMA), polyesters, polycarbonates (PC), polyvinyl chloride (PVC), polylactides (PLA), polystyrene (PS), celluloid, thermoplastic elastomers selected from ethylene-propylene-diene-rubber or styrene/butadiene/styrene block copolymer (SBS) and styrene/ethenebutene/styrene (SEBS) and polyurethanes. Particularly preferred as thermoplastic resins are polyolefins such as polyethylene, polypropylene; polystyrene; ABS. Examples of thermoset plastics include crosslinked epoxides, bakelite, crosslinked polyester resins and crosslinked polyurethanes.

The light curable silicone composition is preferably selected from the group of silicone compositions curable by hydrosilylation. Particular preferred are silicone compositions having the following ingredients, preferably consisting of:
a) at least one polyorganosiloxane having an average of at least two unsaturated organic groups per molecule,
b) at least one polyhydrogenorganosiloxane having on average at least two SiH groups per molecule,
c) optionally one or more fillers,
d) at least one photoactivatable catalyst, comprising a metal selected from the group consisting of Pt, Ru, Rh, Pd, Ir or Ni, or a compound of said metal, and
e) optionally one or more auxiliaries.

Component a) (Si-alkenyl)

In the light activatable, curable siloxane compositions according to the present invention, the alkenyl group-containing polyorganosiloxane (a) preferably has a viscosity range from 0.025 to 500 Pa·s, preferably 0.1 to 100 Pa·s (25 C; shear rate gradient D is 1 s$^{-1}$). It may consist of a single polymer or mixtures of different polyorganosiloxanes such as different substantially linear polymers (a1)) having of low alkenyl content or mixtures of substantially linear polymers (a1) and preferably branched polymers (a2) having a relatively high alkenyl content as described in more detail below.

The polyorganosiloxane (a) preferably consists at least of the siloxane units that are selected from the group consisting of the units $M=R^1R_2SiO_{1/2}$, $D=R^1RSiO_{2/2}$, $T=R^1SiO_{3/2}$, $Q=SiO_{4/2}$ and the divalent units $R^2$, wherein R, $R^1$ and $R^2$ are as defined below.

The alkenyl group content is from about 0.017-160 mol-% based on the siloxy groups or 0.002 to about 22 mmol/g for polymethylvinylsiloxanes, respectively. These may include both linear and branched polyorganosiloxanes. Preferably, the alkenyl content is from about 0.002 to about 3.0 mmol/g for polymethylvinylsiloxanes, preferably of between 0.004 to 1.5 mmol/g. Preferably, the polyorganosiloxanes (a) are substantially linear, that is, the proportion of T and Q units is less than 0.1 mol-%. The polyorganosiloxanes (a) can be described by the general formula (I):

 (I)

wherein
$M=R^1R_2SiO_{1/2}$,
$D=R^1RSiO_{2/2}$,
$T=R^1SiO_{3/2}$,
$Q=SiO_{4/2}$,
with
m1=1-1000
a1=1-10
b1=0-3000
c1=0-50
d1=0-1
e1=0-300,
wherein
R=an organic group, preferably unsubstituted and substituted hydrocarbon radicals, more preferably n-$C_1$-$C_{12}$-alkyl, iso-$C_3$-$C_{12}$-alkyl, tert.-$C_4$-$C_{12}$-alkyl, or $C_1$-$C_{12}$-alkoxy-($C_1$-$C_{12}$)-alkyl, $C_5$-$C_{30}$-cycloalkyl or $C_6$-$C_{30}$-aryl, $C_1$-$C_{12}$-alkyl-($C_6$-$C_{10}$)-aryl, wherein these radicals R can optionally be substituted by one or more F atoms and/or may contain one or more —O— groups.

Examples of suitable univalent hydrocarbon radicals R include alkyl groups, preferably $CH_3$—, $CH_3CH_2$—, $(CH_3)_2$CH—, $C_8H_{17}$— and $C_{10}H_{21}$-groups, cycloaliphatic groups such as cyclohexylethyl, aryl groups such as phenyl, tolyl, xylyl, aralkyl groups such as benzyl and 2-phenylethyl groups. Preferable univalent halogenated hydrocarbon radicals R in particular satisfy the formula $C_nF_{2n+1}CH_2CH_2$— wherein n is a value from 1 to 10, for example $CF_3CH_2CH_2$—, $C_4F_9CH_2CH_2$— and $C_6F_{13}CH_2CH_2$—. A preferred radical is the 3,3,3-trifluorpropyl group.

Particularly preferred radicals R include methyl, phenyl and 3,3,3-trifluoropropyl.

$R^1$=R or an unsubstituted or substituted $C_2$-$C_{12}$-alkenyl radical, with the proviso that at least two radicals $R^1$ are an alkenyl-containing organic group, which are preferably selected from: unsubstituted and substituted alkenyl-containing hydrocarbon radicals such as n-, iso-, tert.- or cyclic $C_2$-$C_{12}$-alkenyl, vinyl, allyl, hexenyl, $C_6$-$C_{30}$-cycloalkenyl, cycloalkenylalkyl, norbornenylethyl, limonenyl, $C_8$-$C_{30}$-alkenylaryl, wherein optionally one or more O atoms can be present (corresponding to ether radicals) and which can be substituted by on or more F atoms.

Preferred radicals $R^1$ are groups like vinyl, allyl, 5-hexenyl, cyclohexenylethyl, limonenyl, norbornenylethyl, ethylidennorbornyl and styryl, particularly preferred is vinyl.

$R^2$=a divalent aliphatic n-, iso-, tert- or cyclic $C_1$-$C_{14}$ alkylene radical or a $C_6$-$C_{14}$-arylene or alkylenearyl radical, respectively, that each bridges two siloxy units M, D or T, for example -D-$R^2$-D-. Here $R^2$ is preferably selected from divalent aliphatic or aromatic n-, iso-, tert- or cyclic $C_1$-$C_{14}$ alkylene, $C_6$-$C_{14}$ arylene or alkylenaryl groups. Examples of suitable divalent hydrocarbon groups $R^2$, which are capable of bridging siloxy units, include all alkylene and dialkylarylene radicals, preferably those such as —$CH_2$—, —$CH_2CH_2$—, —$CH_2(CH_3)CH$—, —$(CH_2)_4$—, —$CH_2CH$ $(CH_3)CH_2$—, —$(CH_2)_6$—, —$(CH_2)_8$— and —$(CH_2)_{18}$ cycloalkylene groups such as cyclohexylene, arylene groups such as phenylene, xylene. Their proportion does not exceed 30 mol-% of total siloxy units in general. Preferred are groups such as alpha,omega-ethylene, alpha,omega-hexylene or alpha,omega-phenylene.

The indices represent average degrees of polymerization. Preferably, the indices are as follows, and are suitably selected in accordance with the desired viscosity.

The above-mentioned polyorganosiloxanes (a) preferably have a structure of the general formula (Ia), preferably of formula (Ia'),

 (Ia),

 (Ia')

wherein R and $R^1$ are as defined above and b1 is <10000.

Preferred siloxy units in the polyorganosiloxane (a) include for example alkenylsiloxy units such as dimethylvinylsiloxy-, alkylsiloxy units such as trimethylsiloxy-, dimethylsiloxy- and methylsiloxy units, arylsiloxy units such as phenylsiloxy units such as triphenylsiloxy-dimethylphenylsiloxy-, diphenylsiloxy-, phenylmethylvinylsiloxy-, phenylmethylsiloxy units.

Preferably, the polyorganosiloxane (a) has a number of siloxy units of from 20 to 10000, preferably from 100 to 6000, more preferably 150 to 3000, particularly preferred 200 to 1500 (average degree of polymerization $P_n$).

Component b) (Si—H Containing Polysiloxanes)

The polyorganohydrogensiloxanes (b) are preferably selected from linear, cyclic or branched Si—H containing polyorganosiloxanes of the general formula (II):

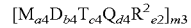

wherein
$M=R^3R_2SiO_{1/2}$,
$D=R^3RSiO_{2/2}$,
$T=R^3SiO_{3/2}$,
$Q=SiO_{4/2}$, wherein
R=n-$C_1$-$C_{12}$ alkyl, iso-$C_3$-$C_{12}$ alkyl, tert. $C_4$-$C_{12}$ alkyl, or $C_1$-$C_{12}$ alkoxy-($C_1$-$C_{12}$)-alkyl, $C_5$-$C_{30}$ cycloalkyl or $C_6$-$C_{30}$ aryl, $C_1$-$C_{12}$ alkyl-($C_6$-$C_{10}$)-aryl, whereby these radicals R may each optionally be substituted with one or more F atoms and/or may contain one or more —O— groups,
$R^3$=R or hydrogen, with the proviso that at least two radicals $R^3$ per molecule are hydrogen, whereby both may be present simultaneously in one molecule, at least two radicals $R^3$ per molecule are, however, hydrogen, R is as defined above, R=Methyl is preferred.
$R^2$=a divalent aliphatic n-, iso-, tert.- or cyclic $C_1$-$C_{14}$ alkylene radical, or a $C_6$-$C_{14}$ arylene- or alkylenearyl radical which each bridges two siloxy units M, D or T,
m3=1 to 1000
a4=1 to 10
b4=0 to 1000
c4=0 to 50 d4=0 to 1
e2=0 to 300.

The polyorganohydrogensiloxanes (b) are preferably linear, cyclic or branched polyorganosiloxanes, whose siloxy units are suitably selected from M=$R_3SiO_{1/2}$, $M^H$=$R_2HSiO_{1/2}$, D=$R_2SiO_{2/2}$, $D^H$=$RHSiO_{2/2}$, T=$RSiO_{3/2}$, $T^H$=$HSiO_{3/2}$, Q=$SiO_{4/2}$, wherein these units are preferably selected from MeHSiO— bzw. $Me_2HSiO_{0.5}$— units optionally together with other organosiloxy units, preferably dimethylsiloxy units.

The siloxy units can be present blockwise or randomly linked together in the polymer chain. Each siloxane unit of the polysiloxane chain can have identical or different radicals.

The preferred polyorganohydrogensiloxanes (b) are structures that are selected from the group that can be described by the formulas (IIIa-IIIe)

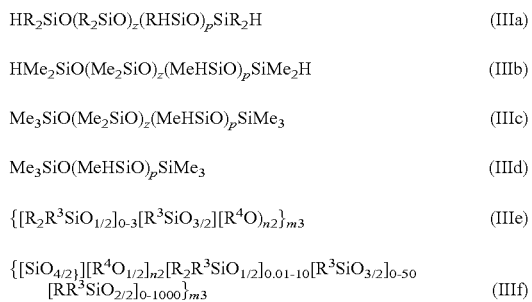

with
z=0 to 1000
p=0 to 100
z+p=b4=1 to 1000
n2=0.001 to 4
wherein $R^4O_{1/2}$ is an alkoxy radical at the silicon,
$R^3$ is as defined above.

The SiH concentration of the polyorganohydrogensiloxanes (b) is preferably in the range from 0.1 to 98 mole percent, preferably from 0.5 to 95 mole percent, based on the number of siloxy groups, respectively.

Examples of preferred structures of component (b1) in the silicone rubber composition according to the present invention include chain extenders (b1) such as:

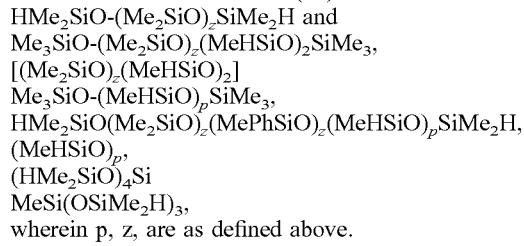

wherein p, z, are as defined above.

The SiH content is determined in the present invention using $^1$H-NMR, see A. L. Smith (Ed.): The Analytical Chemistry of Silicones, J. Wiley & Sons 1991 Vol. 112 p. 356 ff. in Chemical Analysis ed. by J. D. Winefordner.

The preferred amount of polyorganohydrogensiloxanes (b) is from 0.1 to 200 parts by weight based on 100 parts by weight of component (a).

Many properties such as rubber mechanical properties, the crosslinking rate, the stability and the surface tackiness can be influenced by the ratio of SiH to Si-Alkenyl units.

Component c) (Filler)

The silicon rubber mixtures of the present invention further contain optionally one or more optionally surface-modified fillers (c). Surface-modified fillers mean fillers that are hydrophobicized with silanes, siloxanes or siloxanes prior to or during dispersion in the polymer (compounding). In this case, organofunctional groups may be present which participate in the crosslinking reaction and, therefore, preferably have unsaturated groups such as vinyl groups. Preferred silanes, silazanes or siloxanes moreover have HO—, —NHR, RO— groups at the Si atom that can react with water or with the silica. The fillers include, for example, each finely divided, in particular oxide fillers, that is, which have particles smaller than 100 µm (exclusion limit). This can be mineral fillers such as silicates, carbonates, nitrides, oxides, carbon blacks, or silicic acids. Preferably, the fillers are so-called reinforcing silicic acids, which are capable of producing opaque, better transparent elastomers, that is, those which improve the rubber mechanical properties after crosslinking, increase the strength such as pyrogenic or precipitated silicic acid having a BET surface area between 50 and 400 m$^2$/g, which are here preferably hydrophobicized at the surface in a special manner. The component (c), when added to the composition, is used in amounts of 1 to 100 parts by weight, preferably 10 to 80 parts by weight, more preferably 20 to 60 parts by weight based on 100 parts by weight of component (a).

In a preferred embodiment, the silicone composition used according to the present invention contains at least one reinforcing filler (c), in particular pyrogenic silicic acid having a BET surface area greater than 50 m$^2$/g, preferably more than 80 m$^2$/g. The light curable silicone compositions used according to the present invention preferably contain at least one of said oxide fillers, in particular silicic acid having the above-mentioned BET-surface areas. The selection of the fillers is such that sufficiently rapid and complete light curing is possible. Surprisingly, the addition of said oxide filler does not lead to a prevention of the light curing down to transmissions (light transmittance at 400 nm wavelength and a thickness of the test piece of 10 mm) of less than 10% or even of less than 5%, but to the contrary the addition of said oxide fillers seems to positively affect the curing rate up to high layer thicknesses.

Component (d) (Catalyst)

Component (d), the hydrosilylation catalyst, preferably contains at least one metal which is selected from the group consisting of Pt, Pd, Rh, Ni, Ir or Ru, preferably Pt. The hydrosilylation catalyst can be used in metallic form, in form of a complex compound and/or in the form of a salt. The catalysts can be used with or without carrier materials in colloidal or powder form. Examples of photoactivatable catalysts include η-diolefin-σ-aryl platinum complexes as disclosed in U.S. Pat. No. 4,530,879, EP 122 008, EP 146 307 or US 2003-0199603, platinum diketonates such as (Pt(acac)$_2$), and platinum compounds whose reactivity, for example, with azodicarboxylate esters as disclosed in U.S. Pat. No. 4,640,939, can be controlled. Most preferred are transition metal compounds with at least one sigma-bound alkyl or aryl radical, preferably corresponding platinum compounds such as optionally alkyl or trialkylsilyl-substituted cyclopentadienyl-tris-alkyl platinum compounds, cyclopentadienyl-tris-(triorgano-silyl)alkyl platinum compounds, in particular alkylcyclopentadienyl-trimethyl platinum such as methylcyclopentadienyl-trimethyl platinum. Particularly preferred catalysts in view of their reactivity and cure rate are: ($η^5$-cyclopentadienyl)-trialkyl platinum complex compounds with (Cp=cyclopentadienyl) such as (Cp) trimethyl platinum and (methyl-Cp)trimethyl platinum. The amount of component (d) is preferably 0.1-5000 ppm, preferably 0.5-1000 ppm, preferably 1-500 ppm, more preferably 2-100 ppm, calculated as metal, based on the weight of components (a) to (c).

Auxiliaries (e)

Inhibitors

The rate of the hydrosilylation reaction can be affected as known by a number of additional compounds, the so-called inhibitors (e). This allows to further influence the rate of crosslinking after photoactivation, that is, the temperature and the time can be determined at which/in which the silicone rubber composition or mixture is cured or vulcanized to an elastomeric molded body after photoactivation. Appropriate inhibitors for the photoactivatable hydrosilylation of the present invention at platinum concentrations above 30 ppm platinum are inhibitors such as vinyl siloxanes, 1,3-divinyltetramethyldisiloxane or tetravinyltetramethyltetracyclosiloxane. Other known inhibitors such as ethynylcyclohexanol, 3-methylbutynol or dimethyl maleate can be used too. The inhibitors are used to delay the curing reaction after photoactivation in a desired manner. Basically, any inhibitors known for the class of the group of platinum metals can be used, if not already a sufficiently long processing time is achieved by selection of the ligands of the catalyst (d). A preferred embodiment is to use the catalyst without the inhibitor. If the inhibitor component is used, preferably about 0.001% to 0.5 wt. %, particularly preferred 0.05 to 0.2 wt. % in particular of the alkynols are metered in at metal contents of the component (d) from 10 to 100 ppm. The total amount of the possible auxiliaries (e) is preferably 0 to 15 parts by weight based on 100 parts by weight of component (a) and (b).

Photosensitizers can also be used as auxiliaries to increase the light yield in thin layers.

Adhesion Promoter

Suitable adhesion promoters include for example:

(1): at least one organosiloxane having at least one alkoxysilyl group, (2): at least one organosilane having at least one alkoxysilyl group, (3): at least one aromatic organic compound having at least two aromatic groups and at least one group which is reactive in the hydrosilylation reaction.

Adhesion promoter component (1) is preferably a polyorganosiloxane which at least contains a unit selected from the group consisting of:

$RHSiO_{2/2}$ and $R^5(R)SiO_{2/2}$, wherein R is as defined above and may be the same or different and $R^5$ is selected from the group consisting of: unsaturated aliphatic groups containing up to 14 carbon atoms, epoxy group containing aliphatic groups having up to 14 carbon atoms, cyanurate containing groups and isocyanurate containing groups, and further have at least one unit of the following formula:

$$O_{2/2}(R)Si-R^4-SiR_d(OR^3)_{3-d} \quad (3)$$

wherein

R is as defined above, $R^3$ is selected from H (hydrogen) and alkyl radicals having 1-6 carbon atoms, $R^4$ is a bifunctional optionally substituted hydrocarbon radical having up to 15 carbon atoms, which may include one or more hetero atoms selected from O, N and S atoms and which is bonded to the silicon atom over a Si—C bond, and wherein d is 0 to 2.

A preferred example is:

[chemical structure]

Adhesion promoter component (2) is preferably selected from compounds of the following formula:

$$X-(CR^6_2)_e-Y-(CH_2)_eSiR_d(OR^3)_{3-d}$$

wherein

X is selected from the group consisting of: halogen, pseudohalogen, unsaturated aliphatic groups containing up to 14 carbon atoms, epoxy groups containing aliphatic groups containing up to 14 carbon atoms, cyanurate containing groups and isocyanurate containing groups, Y is selected from the group consisting of: single bond, heteroatom containing group selected from: —COO—, —O—, —S—, —CONH—, —HN—CO—NH—, $R^6$ is selected from hydrogen and R, which is as defined above, e is: 0, 1, 2, 3, 4, 5, 6, 7, or 8, and may be the same of different, R is as defined above and may be the same or different, $R^3$ is as defined above and may be the same or different, d is 0, 1, or 2.

Preferred examples include:

[chemical structures]

A further group of adhesion promoter components (3) is preferably selected from compounds of the following formula:

[chemical structure] (3i)

wherein r is 0 or 1, $R^7$ may be the same or different and is selected from the group consisting of: hydrogen atom, hydroxyl group, halogen, alkyl group, alkenyl group, alkoxy group, alkenyloxy group, alkenylcarbonyloxy group and an aryl group, and a group of the formula: $-E_f-Si(OR)_{3-d}R_d$, wherein R may be the same or different and d is as defined above, a group of the formula —O—Si(R)$_2$R$^1$, wherein R and R$^1$ are as defined above,
a group of the formula -E$_f$-Si(R)$_2$H, wherein R is as defined above,
wherein E is a divalent organic a group having up to eight carbon atoms and 0 to 3 heteroatom groups selected from: —O—, —NH—, C=O, and —C(=O)O—, and f is 0 or 1,
and Z is selected from the following groups:

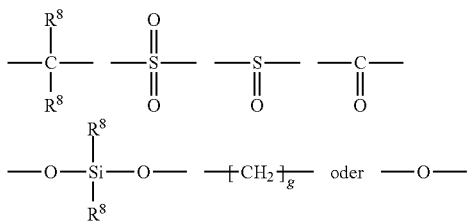

wherein R$^8$ is selected from the group consisting of: hydrogen atom, halogen atom or a substituted or unsubstituted alkyl group, aryl group, alkenyl group, alkynyl group and, and
g is a positive number of at least 2,
wherein at least one group selected from R$^7$ and R$^8$ is reactive in the hydrosilylation reaction.

A preferred component (3) includes:

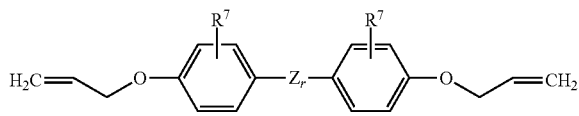

wherein Z$_r$, R$^7$, R$^3$, R and d each are as defined above.

A preferred light curable silicon composition contains:
3 to 99 wt. % of at least one alkenyl group-containing polysiloxane a),
0.2 to 60 wt. % of at least one SiH functional polysiloxane b),
0.1 to 60 wt. %, more preferable 5 to 50 wt. % of at least one filler c), preferably an oxide filler, such as pyrogenic silicic acid,
at least one photoactivatable catalyst d), corresponding to a metal content of 1 to 500 ppm,
0 to 30 wt. % of one or more auxiliaries e), each based on the total amount of components a) to c).

In a preferred embodiment, the silicone composition of the present invention contains:
a) 100 parts by weight of at least one alkenyl group-containing polyorganosiloxane having a viscosity range of 0.025 and 500 Pa·s (25° C.; shear rate gradient D of 1 s$^{-1}$),
b) from 0.1 to 200 parts by weight of at least one polyorganohydrogensiloxane, wherein 0.5 to 20 mol, preferably 1 to 5 mol of SiH groups per mol of alkenyl groups are used,
c) optionally from 1 to 100 parts by weight of one or more fillers,
d) from 0.5 to 1000 ppm of at least one hydrosilylation catalyst calculated as metal based on the amount of components (a) to (c),
e) optionally from 0.0001 to 2 wt. % of one or more inhibitors based on the amount of components (a) to (c), and optionally further auxiliaries.

The application of the silicone rubber compositions according to the present invention is obtainable by mixing components (a) to (e), wherein the substances are suitably combined in preferred sequences, and preferably at least two partial mixtures are combined immediately prior to activation.

In a preferred embodiment of the process according to the present invention the silicone composition is curable upon photoactivation of 0.01 to 240 sec in less than 6 minutes, preferably in less than 5 minutes, even more preferably in less than 4 min. Photoactivation is carried out with light of a wavelength in the range of 200 to 500 nm (UV wavelength range). In the process according to the present invention an UV radiation source for the light activation is chosen, for example, from the group of UV lamps such as xenon lamps which can be operated as flash lamps, undoped mercury lamps or mercury lamps doped with iron or gallium, black light lamps and excimer lamps as well as LED UV lamps.

The composite molded bodies prepared according to the present invention preferably have an inner core made of the selected thermoplastic resin with an outside shell or shaped elements made of a silicone elastomer. However, it is also possible according to the process of the present invention to produce a molded body wherein the thermoplastic resin is arranged on the outside and the silicone elastomer is located inside such as in damping elements in which, for example, a core of the silicone elastomer is placed in a thermoplastic cushion. The latter embodiment is especially available if the thermoplastic polymer/resin transmits rays required to cure the light curable silicone composition.

In another preferred embodiment in a step I) of the process, a molded article is at first molded from a substantially UV light transmissive thermoplastic or thermoset material at 20-200° C. and a pressure of 1 to 400 bar. The so obtained molded body is fixed at room temperature or above it (20 to 200° C., preferably 30-150° C.) until the demolding of the finished article made of thermoplastic or thermoset plastic and silicone in step IV) wherein it is optionally cooled to a mold temperature below 200 C. In the subsequent step II) the light curable silicone composition is injected at a controlled pressure on the mold cavity facing side of the molded article made of thermoplastic or thermoset resin. The injection pressure for the light curable silicone composition is 1-400 bar, preferably 1-200 bar, more preferably at 1-<30 bar. The melt temperature is preferably below the equilibrium melting temperature T$_m$, here the softening temperature (measured as deflection temperature at 5 N) of the molded resin molded article. The silicone composition is preferably injected at a temperature which is preferably 10° C., even more preferably more than 20° C. below the softening temperature of the molded resin article. Typically, step II) is preferably carried out at temperatures of less than 90° C., more preferably less than 80° C. (see FIG. 2).

In a further step III) the light curable silicone composition is irradiated through the molded article made of thermoplastic or thermoset resin with light of the suitable wavelength 190-600 nm and preferably having a specific power from 0.1 to 100 watts/cm$^2$, suitably for 1-500 sec, preferably <200 sec, in order to achieve curing of the silicone composition. Preferably, the irradiation is carried out with a specific irradiation energy of 1-50 J/cm$^2$ at said temperatures.

The demolding of the composite body made of thermoplastic or thermoset resin and the cured silicone composition from the mold cavity is carried out in a next step IV) optionally by using ejectors or compressed air.

Figure 2:
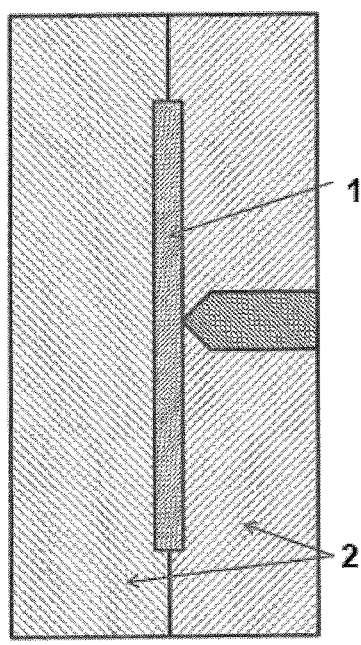
Figure 2:
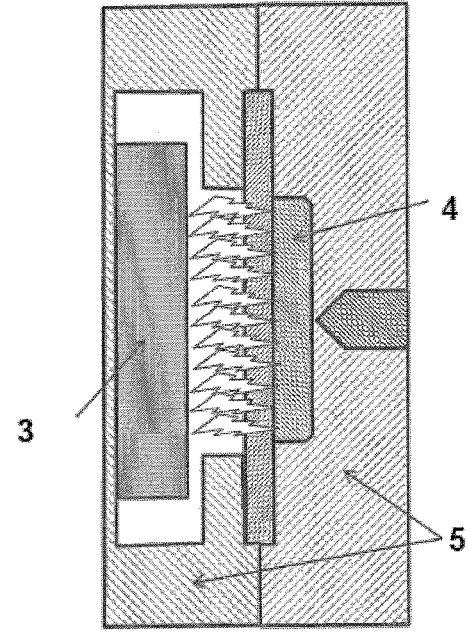

FIG. 2 schematically illustrates the process described above.

Step I) shows the production of the thermoplastic or thermoset molded article. Steps II) and III) show the irradiation of the silicone composition through the thermoplastic or thermoset molded article. Step I) and the following steps may optionally be carried out in a molding tool using variable mold cavities.

The reference numbers are described below:
1: UV light transmissive plastic molded article,
2: Molding tool for the light transmissive molded article,
3: LED UV light source,
4: UV crosslinkable silicone and
5: Molding tool for the UV crosslinkable silicone.

FIG. 1 shows an example of a molded article produced according to the present invention. The reference numbers mean:
6: cured silicone composition
7: molded article made of thermoplastic or thermoset resin
8: Openings for mechanical connection or anchoring In the process according to the present invention, the thermoplastic molded article and the cured silicone composition may be connected by adhesive forces and/or by mechanical forces or elements. That is, in principle, the bond between the thermoplastic molded article and the silicone elastomer molded article can be effected by bonding or adhesion between the two molded articles and/or by mechanical connection the two molded articles. In the latter case, a fixed connection to the silicone elastomer molded article can be generated a by choosing a suitable geometry of the molded articles, in particular of the previously prepared thermoplastic molded article, for example by recesses, such as in the form of threads, anchors, barbs, fasteners in the thermoplastic molded article (see FIG. 1). In the first case, different measures are appropriate to promote adhesion between thermoplastic molded article and the silicone elastomer molded article wherein these measures may be used individually or in combination. For example, adhesion promoters described above may be added to the light curable silicone composition, or the surface of the thermoplastic molded article can be pre-treated by appropriate measures, such as etching, plasma treatment, flame treatment, coating by so-called primers. In one embodiment of the process according to the present invention, the thermoplastic molded article and the cured silicone composition are detachably connected. This is advantageous, for example, when the composite molded bodies according to the present invention are to be recycled.

A variety of composite molded articles or various applications made of a thermoplastic molded article part and a silicone elastomer molded article part can be produced in a simple manner according to the process of the present invention. Examples of hard-soft molded articles obtainable according to the process of the present invention include: seals in mechanical engineering, automotive applications such as fan flaps having a silicone lip, push switches for pneumatic central locking, electrical goods such as insulators, hollow tube insulators (silicone lamellae on PE or PP pipes), keyboards for electronic devices, food packaging such as bottle caps or plugs such as wine bottle caps, champagne bottle caps, beer bottle caps, such as corks, coffee capsules, closing or dosing caps or closing or metering valves having elastic sealing lips, food containers or boxes (silicone seals in/on thermoplastic containers), kitchen appliances such as dough scrapers, diving masks, face masks, teethers, baby suckers (pacifiers), thermoplastic soap dishes made of acrylate or PVC with an elastomeric bottom section made of light curable silicone (see FIG. 2), 'adult toys' such as vibrators, dildos, butt plugs and cock rings, furniture, trays, design objects which are haptically designed with silicone elastomers, applications for textiles and shoes, brand emblems, sports and recreational equipment such as watch straps, tools, tool handles, in particular in the kitchen and medical technology, elastic sliding brakes or stacking aids for plates, bowls, scrapers or spatulas, implants, tubes or valves, optionally with integrated flange elements, tubes with integrated pipe bends for example in the house hold and medical technology.

There are various procedures how the composite molded bodies of the present invention can be prepared. A distinction must be made in particular between such procedures wherein the thermoplastic molded article is first produced in the mold, for example, by injection molding, or procedures wherein the preformed thermoplastic molded article is placed in the mold which is subsequently filled with the light curable silicone composition and is finally irradiated, preferably with UV light, to form the composite molded bodies of the present invention.

In principle, the process of the present invention can be carried out either continuously, for example in an extrusion process, or batchwise. In the first case, for example, a thermoplastic molded element such as a tube, a string or a pipe, is continuously generated, which is then moved through an exposure station after a likewise continuous application of the silicone composition, and subsequently is, for example, wound and/or cut into appropriate sections. Or the already preformed thermoplastic or thermoset molded element is introduced batchwise or continuously into a mold or molding tool, and is cured at an exposure station after continuous application of the light-curable silicone composition, and the resulting composite molded body is continuously demolded and worked up.

More preferably, however, a certain mold or molding tool, is either loaded with a preformed thermoplastic molded element to which subsequently the light curable silicone composition is added and is cured by UV radiation. Subsequently, the resulting composite body is removed, and the process is repeated (discontinuous mode). Alternatively, the thermoplastic molded element is previously produced, for example by injection molding in a common mold or molding tool.

The molds used in the process according to the present invention must of course comprise at least one region which is transmissive to the radiation, that is, a transparent region, which may consist of quartz glass or a plastic such as PMMA.

The composite molded bodies obtained by the process according to the present invention can also be thick-walled composite molded bodies which have—even in the area of the silicone elastomer—a thickness of at least 3 mm up to for example about 100 mm. More preferably, the composite molded bodies according to the present invention have at least a thickness of 3 mm and more in all three dimensions, preferably at least 10 mm to for example about 100 mm. Accordingly the composite molded bodies of the present invention have such dimensions suitable for receiving at least one ball having a diameter of at least 3 mm, more preferably at least 10 mm, even more preferably at least 20 mm. This also applies to the cured silicone article that likewise has such dimensions suitable for receiving at least one ball having a diameter of at least 3 mm, more preferably at least 10 mm, even more preferably at least 20 mm.

Injection of the thermoplastic melts is advantageously carried out at screw temperatures of 180-350° C. (LDPE-PA types or PEEK) and a pressure of 250-2500 bar into cavities or mold cavities having a temperature of 15-160° C. The plastic melt solidifies therein under cooling in a few seconds per mm wall thickness and can then be demolded and further processed.

The light curable liquid silicone rubber (LSR) is injected advantageously at 50-1000 bar and a screw temperature of 20-35° C. (LSR) or 35-75° C. (high viscous Si solid rubber), wherein the cavity has a temperature of 15-80° C.

Suitable irradiation times with UV light are suitably selected between 5-300 sec at area related powers of from 1-50 W. cm$^{-2}$ and wavelengths of 190-400 nm.

The invention is illustrated by the following examples.

EXAMPLES

Materials

Material 1: PP Moplen HP400M, softening temperature 96 C (as deflection temp. at 5 N)
Material 2: Light activatable silicone composition.

14.1 parts by weight of dimethylvinylsiloxy-terminated polydimethylsiloxane (a1) having a viscosity of 10 Pa·s at 25° C. $M^{Vi}_2 D_{539}$, 25.6 parts by weight of dimethylvinylsiloxy-terminated polydimethylsiloxane (a1) having a viscosity of 65 Pa·s at 25° C., 3.9 parts by weight of hexamethyldisilazane, 0.03 parts by weight of 1,3-divinyltetramethyldisilazane and 2.1 parts by weight of water are mixed in a kneader.

Subsequently, 18 parts by weight of pyrogenic silicic acid (c) having a BET surface area of 300 m$^2$/g were mixed in, heated to about 100° C. and stirred for about an hour ca. and then water and excess silazane/silanol residues were removed by evaporation at 150° C. to 160° C. (finally vacuum at p=20 mbar).

Then it is diluted with 33.4 parts by weight of a dimethylvinylsiloxy-terminated polydimethylsiloxane (a1)) having a viscosity of 10 Pa·s.

To 93.2 parts by weight of this mixture 10.4 parts by weight of a SiH crosslinking agent (component (b)) consisting of a dimethylhydrogensiloxy-terminated polydimethylhydrogenmethylsiloxane of the general formula $M_2 D_{100} D^H_{20}$ and an SiH content of 2.3 mmol/g having a viscosity of 40 mPa·s at 25° C. were added under stirring with a twin kitchen mixer (Krups) at 25 C.

Then 2 parts by weight of the light activatable catalyst were added in 5 minutes under stirring with a kitchen mixer in yellow light (exclusion of light <550 nm). This catalyst consisted of 2000 parts by weight of a linear vinyl-terminated polydimethylsiloxane having a viscosity of 10 Pa·s at 25° C. with a vinyl content of 0.05 mmol/g and 1 article by weight of trimethyl(methylcyclopentadienyl) platinum (company Strem) with a platinum content of 61.1%. This amount is used to set a platinum content of 6.4 ppm in the reactive mixture of material 2.

Example 1

Production of a Composite Molded Body of PP and Silicone

Polypropylene material 1 is introduced into a two component mold, which is connected to an injection molding apparatus of the company Engel type LIM 200, at a screw temperature of 200° C. and a pressure of 1000 bar. The PP is injected into the mold, which had a temperature of 35° C. and was cooled down thereon in 60 seconds. The obtained molded article (eye-bolt (Ausziehöse)) is placed into the cavity (mold cavity) predetermined for the silicone elastomer with a handling robot, and 4 g photocurable silicone mixture of material 2 were injected within 0.5 sec at 35° C. and 100 bar. The cavity with the light-activatable silicone elastomer composition was irradiated with an UV lamp of the type Phoseon through a window made of UV transparent polymethyl methacrylate (PMMA) of 4 cm$^2$ using UV light of the wavelength 365 nm having an area related power of 4 W/cm$^2$ for 15 sec at a distance of 1.5 cm.

The PP molded article was formed herein as eye-bolt (Ausziehöse) with openings in the portion to be embedded for insert molding with the silicone elastomer and its mechanical anchoring, as shown in FIG. 1.

After molding and curing the silicone elastomer a closing cap for beverage bottles as shown schematically in FIG. 1 was obtained which could be removed from the mold.

The invention claimed is:

1. A process for the preparation of plastic composite molded bodies, comprising the steps of:
   (a) providing a molded article of a thermoplastic resin in a mold,
   (b) introducing a light-curable silicone composition into said mold containing said molded article,
   (c) irradiating the light-curable silicone composition with light of a wavelength suitable to cure the silicone composition to form a composite molded body from said molded article and the cured silicone composition, wherein the molded article includes a through-hole to form a fixed connection with the cured silicone composition so that the molded article and the cured silicone composition are mechanically bonded to one another.

2. The process according to claim 1, wherein the thermoplastic resin has a heat deflection temperature (HDT) according to DIN EN ISO 75-1,-2 of less than 160° C.

3. The process according to claim 1, wherein the thermoplastic resin is polypropylene.

4. The process according to claim 1, wherein the light-curable silicone composition is curable by hydrosilylation.

5. The process according to claim 4, wherein the light-curable silicone composition comprises:
   (a) a polyorganosiloxane having an average of at least two unsaturated organic groups per molecule,
   (b) a polyhydrogenorganosiloxane having on average at least two SiH groups per molecule,
   (c) optionally one or more fillers comprising silicates, carbonates, nitrides, oxides, carbon blacks, or silicic acids,
   (d) a photoactivatable catalyst containing a metal selected from the group consisting of Pt, Ru, Rh, Pd, Ir or Ni, and
   (e) optionally one or more auxiliaries comprising crosslinking inhibitors, photosensitizers, or adhesion promotors.

6. The process according to claim 1, wherein the composite molded body is selected from the group consisting of hard-soft molded bodies for seals in mechanical engineering; automotive applications; electrical goods; insulators; keyboards; food packaging; bottle caps; coffee capsules; closing caps; dosing caps; closing valves; metering valves; food containers; kitchen appliances; dough scrapers; plates; bowls; diving masks; face masks; teethers; baby suckers; vibrators; dildos; butt plugs; cock rings; furniture; shelves; design objects which are haptically designed with silicone elastomers; applications for textiles and shoes; brand emblems; sports and recreational equipment; watch straps;

tools; tool handles; syringe plungers; intravenous valves; scrapers; spatulas, implants; tubes or valves optionally with integrated flange elements, tubes with integrated pipe bends.

7. The process according to claim 1, wherein the molded article and the cured silicone composition are detachably connected.

8. The process according to claim 1, wherein the molded article is produced only in the mold.

9. The process according to claim 1, wherein the molded article is placed into the mold in an already finished form.

10. The process according to claim 1, wherein the process is carried out batchwise.

11. The process according to claim 1, wherein the composite molded body has such dimensions suitable for receiving at least one ball having a diameter of at least 3 mm.

12. The process according to claim 1, wherein the cured silicone composition has such dimensions suitable for receiving at least one ball having a diameter of at least 3 mm.

13. The process according to claim 1, wherein the light-curable silicone composition is irradiated through the molded article.

14. A plastic composite molded body, obtained by the process according to claim 1.

15. A plastic composite molded body, obtained by the process according to claim 5.

16. A bottle cap obtained by a process according to claim 1.

17. A food container obtained by a process according to claim 1.

* * * * *